Jan. 17, 1933.  H. K. BIGELOW  1,894,935
BRAKE TESTING EQUIPMENT
Filed Jan. 6, 1927   2 Sheets-Sheet 1
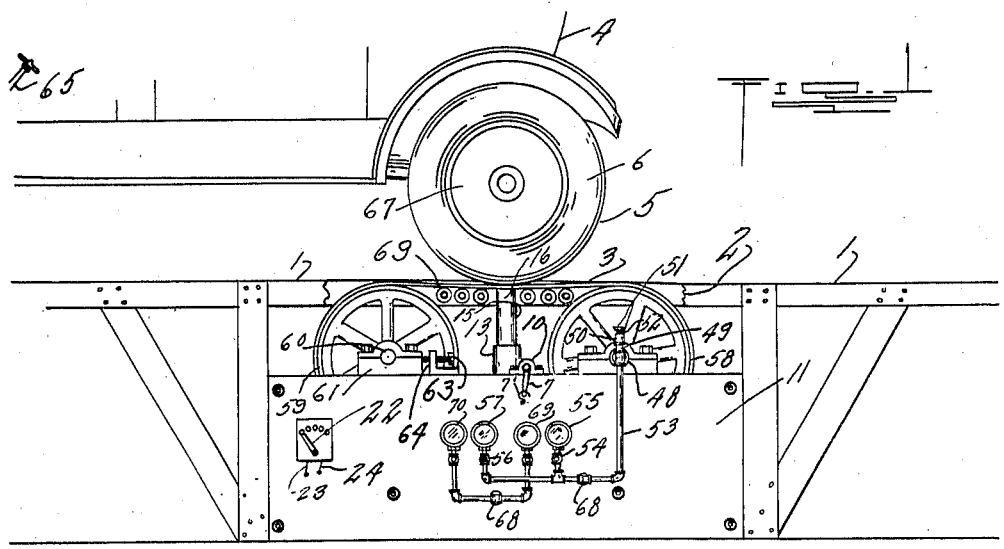

Jan. 17, 1933.  H. K. BIGELOW  1,894,935
BRAKE TESTING EQUIPMENT
Filed Jan. 6, 1927  2 Sheets-Sheet 2
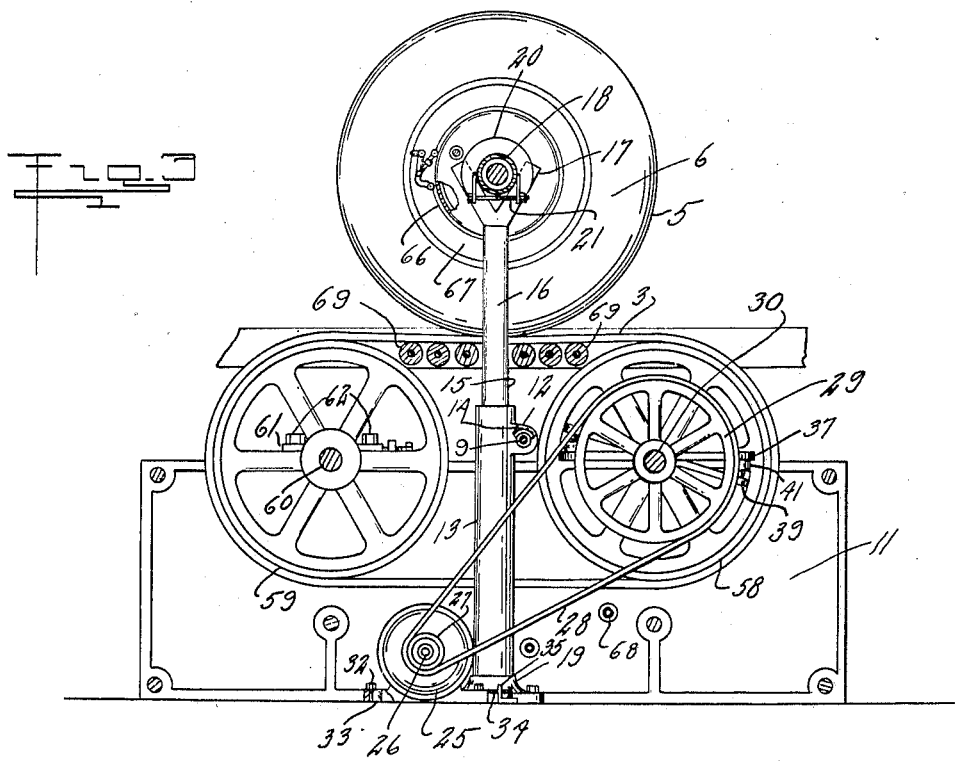

Patented Jan. 17, 1933

1,894,935

UNITED STATES PATENT OFFICE

HARRY K. BIGELOW, OF TOLEDO, OHIO, ASSIGNOR, BY MESNE ASSIGNMENTS, TO BENDIX-COWDREY BRAKE TESTER, INC., OF NEW YORK, N. Y., A CORPORATION OF DELAWARE

BRAKE TESTING EQUIPMENT

Application filed January 6, 1927. Serial No. 159,429.

This invention relates to testing gripping or transmitting loads and strains.

This invention has utility when incorporated in brake testing equipment especially for transmitting pressure or load effectiveness of the brakes.

Referring to the drawings:

Fig. 1 is a side elevation, with parts broken away of an embodiment of the invention for testing the brakes of motor vehicles;

Fig. 2 is a fragmentary plan view of the device of Fig. 1;

Fig. 3 is a section on the line III—III, Fig. 2, looking in the direction of the arrow; and Fig. 4 is a detail view of the transmission connection.

Deck or floor 1 is shown as having opening 2 therein at which opening 2 there are provided movable supports or belts 3 for a pair of aligned road wheels of a vehicle. Vehicle 4 may be driven along the platform 1 and over opening 2 to have tread portions 5 of its tires 6 sustained by the movable supports or belts 3. As so sustained, removable crank 7 may be placed upon key terminus 8 of shaft 9 mounted at bearing 10 fixed with frame 11 and bearing 12 fixed with upright guide stem 13. Fast on this shaft 9 is pinion 14 in mesh with rack 15 guided by upright guide stem 13 to carry plunger 16 upwardly to such extent that Y upper terminal portion 17 thereof may serve as a fork with its prongs upon opposite sides of motor vehicle axle 18. It is not contemplated that this plunger 16 and stem 13 fixedly mounted by base 19 with the frame 11 shall engage the axle 18 to such an extent as to remove the load of the vehicle off the belts 3. It is only contemplated that the fork 17 will hold the vehicle from travel forwardly or rearwardly by lock 7' for handle 7.

Additionally, disk 20 is mounted on the axle 18 outwardly from each of these forks 17 with such disk anchored with the axle by clamping bolt 21. These two disks 20 as thus clamped with the axle 18 outwardly from each of the forks 17 preclude any lateral jumping or shifting of the vehicle. The vehicle is thus retained in located position as to its tread 5 upon supporting means or belts 3.

Starting switch 22 may be thrown for connecting electric supply lines 23, 24, for operating motor 25 having shaft 26 carrying pulley 27 having belt 28 passing thereover to large pulley 29 thereby effective for actuating this large pulley 29 at a reduced speed. This pulley 29 is fixedly mounted on shaft 30 anchored in bearings 31. Bolts 32 through slots 33 in the base of the motor 25 fix the motor in position as to the shaft 30 and by slacking off these bolts 32 and operating bolts 34 in flanges 35, the motor 25 may be adjusted to determine the degree of tautness desired for the belt 28 about the pulleys 27, 29. This shaft 30 carries outwardly overhanging arms or supports 37. These arms 37 are provided with ears 38 in which are pivotally mounted links 39 pivoted to pistons 40 in cylinders 41 fixed with arms 42 of complementary spider mounting on shafts 43, 44, aligned with the shaft 30. This alignment is maintained by sleeve portions 45 from the shafts 43, 44, as extending over the ends of the shaft 30.

While the pistons 40 are rockable in relation to the arms 37 the cylinders 41 are rigid with arms 42. From these cylinders 41 extend ducts 46 to concentric ways 47 in the respective shafts 43, 44. Outwardly from the shaft 30 these shafts 43, 44, terminate in glands 48 from which extends ducts 49 to chambers 50 having filling caps 51 and screw pistons 52 therein. From each duct 49 extends duct 53 to valve 54 for cutting in or out low pressure gage 55 and valve 56 for cutting in or out high pressure gage 57. For truck testing, the low pressure gage 55 may be cut out by closing the valve 54 and the high pressure gage 57 cut in by opening of the valve 56. The cylinders 41 and ducts communicating with gages 55 and 57 are filled with oil through chambers 50 by removing filling caps 51. Caps 51 are then replaced and the oil is given such a small initial pressure, by screwing down screw piston 52 in chambers 50, as will bring the indicators in gages 55 and 57 to zero, or other predetermined indication, when no load is on the machine. The motor 25 may then be started and is a drive effective in rotating the shafts 43, 44, through these hydraulic transmission connections. Throughout the specification and claims "transmission element" is used to describe cylinder 41 and piston 40 and "transmission" is used to describe all of the elements which cause motor 25 to drive one of the pulleys 58. The transmission is a hydraulic or yieldable transmission inasmuch as it includes the hydraulic and yieldable transmission element. Each of these shafts 43, 44, carries pulley 58 over which extends the load carrying support or belt 3 from companion follower or idler pulley 59 loosely mounted on shaft 60. This shaft is carried in bearings 61 having bolts 62 in slot 62' which may be slacked off and, by the operation of bolts 63 in angle brackets 64, belts 3 may be given the desired degree of tautness for so sustaining the tread 5 as to approximate the area of contact which such tread should experience in normal road operations.

With the motor 25 in operation there is effective through the hydraulic transmission a driving of the belts 3 from the pulleys 58 from the shafts 43, 44. Brake lever 65 in the motor vehicle 4 may be operated to set brake 66 for the respective wheels 67 on the axle 18 having treads 5 coacting with the supports 3. This holding back action from the spinning or driving of the wheels 67 places load strain on the transmission directly indicated in the gages 57 for heavy truck testing or 55 as connected for lighter car testing.

In practice it is convenient to have cross connecting ducts 68 in providing supplemental gages 69, 70, adjacent the respective gages 55, 57. This permits the one conducting the tests to check the gripping action of the brakes of each wheel of the pair of wheels so that in brake adjustment there may be a desired nicety of equilization. In instances where the belt say requires excessive tautness to overcome, carrying rollers 69 may be introduced on the underside of the upper reaches of these belts 3.

What is claimed and it is desired to secure by Letters Patent is:

In a brake testing apparatus, a roll for imparting motion to a wheel, a shaft to which the roll is fastened, an arm fastened to the shaft, a rotatable driving wheel having an axis coincident with that of the shaft, means connecting the arm and driving wheel and including a fluid pressure cylinder having its axis at an angle to that of the shaft and at a distance from the axis of the shaft whereby rotation of the wheel will cause the fluid in the cylinder to be compressed and to exert a torque upon the arm, a conduit connecting the cylinder with an axial bore in the shaft, a tube fastened in the bore, a stationary packing in which the tube rotates as the shaft is driven, and a pressure responsive indicator connected to the packing chamber.

In witness whereof I affix my signature.

HARRY K. BIGELOW.